May 28, 1963 A. G. NERHEIM 3,091,113
GAS DENSITY BALANCE EMPLOYING DIFFERENTIAL FLOW MEASUREMENT
Filed Sept. 4, 1957 2 Sheets-Sheet 1
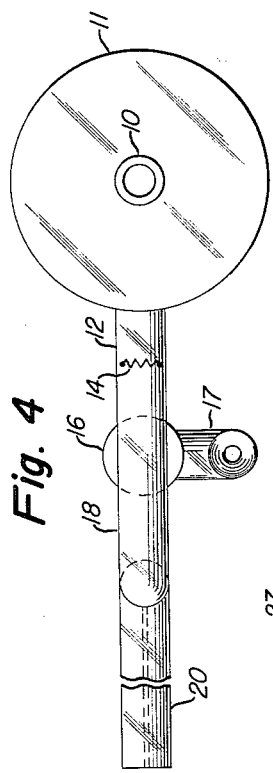
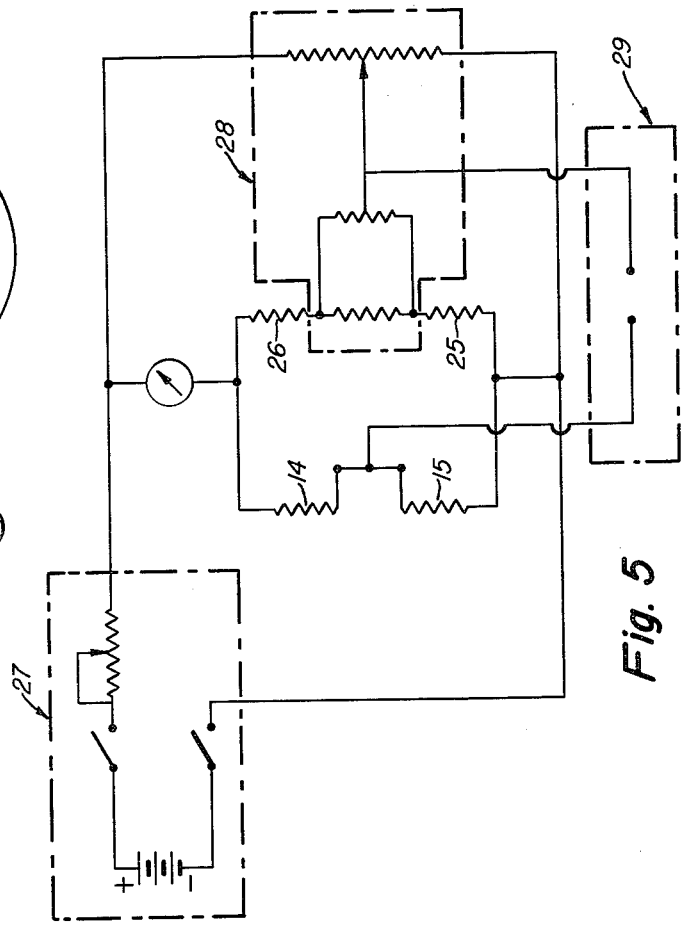
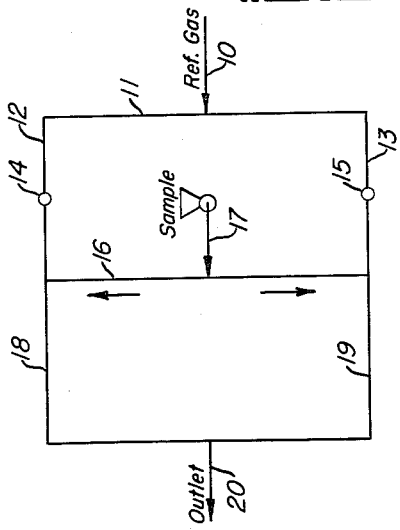
INVENTOR.
Arvie Glenn Nerheim
BY
Everett A. Johnson
ATTORNEY May 28, 1963  A. G. NERHEIM  3,091,113
GAS DENSITY BALANCE EMPLOYING DIFFERENTIAL FLOW MEASUREMENT
Filed Sept. 4, 1957  2 Sheets-Sheet 2

INVENTOR.
Arvie Glenn Nerheim
BY
*Everett A. Johnson*
ATTORNEY

United States Patent Office 3,091,113
Patented May 28, 1963

3,091,113
GAS DENSITY BALANCE EMPLOYING DIFFERENTIAL FLOW MEASUREMENT
Arvie Glenn Nerheim, Calumet City, Ill., assignor to Standard Oil Company, Chicago, Ill., a corporation of Indiana
Filed Sept. 4, 1957, Ser. No. 682,036
7 Claims. (Cl. 73—30)

This invention relates to method and means for the analyses of fluids by means of measuring the density thereof. More particularly, the invention relates to a system for measuring gas and vapor densities as an adjunct to gas chromatography.

Gas chromatography, a new and useful technique for separation and analysis of complex mixtures of volatile materials, is a system wherein components of such mixtures are separated in simple and inexpensive equipment by partition between a stationary phase and a moving gas phase. A few microliters of sample can be analyzed in a relatively short time and the technique is applicable to samples ranging from fixed gases to those that must be distilled at low pressure.

The separations take place in small columns packed with a specific type of packing which support the stationary liquid phase. The liquid, amounting to about 40 weight percent of the solid packing, is distributed as a thin film that provides a large surface for the gas to contact. Components of a sample are separated as they are carried through the column by a moving gas phase, called the eluting gas, and the components are detected as they pass from the column.

Variables that affect separation include column length, flow rate of the eluting gas, temperature, and the chemical nature of the stationary phase. A flow rate of eluting gas is selected to give an adequate separation in a reasonable length of time, the usual range being 5 to 75 ml. per minute and about 20 ml. per minute or more being preferred. The lower rates are useful for improving difficult separations because of the increased contact time in the column. An analysis usually requires 20 to 60 minutes. Nitrogen, helium, hydrogen and carbon dioxide are common eluting gases.

Typically one component of a binary mixture is less soluble in the stationary phase than the other and the less soluble component will remain in the gas phase and be swept through the column at nearly the velocity of the eluting gas. The second component, however, will pass through the column at a lower rate because the process of dissolving in and expelling from the stationary liquid phase takes additional time. Because of differences in partition, the first and second components emerge from the column in the eluting gas at different times and thus are separated.

Several types of detectors have heretofore been proposed and tried for sensing the presence of the component in the eluting gas and it is with respect to such detectors that this invention is directed. It will be apparent that for a detector to be useful in this type of system, the response of the detector to change in composition of the eluting gas stream must be rapid. However, it is also desired that the detector be substantially insensitive to flow rate therethrough.

It is, therefore, an important object of this invention to provide an apparatus which has a fast response and is capable of use over a wide range of operating conditions. Another object of the invention is to provide a detector which has a minimum sensitivity to flow rate while retaining a fast response. A further object of the invention is to provide a gas density balance which is particularly suited for use in gas chromatography.

Another object of the invention is to provide a method and apparatus for measuring fluid densities wherein the undesirable effects of changes in rate of flow are avoided while being highly responsive to changes in composition. It is also an object of the invention to provide a gas density balance system wherein variations in composition produce an electrical output which is linear. A further object of the invention is to provide a gas density balance which is of simple and inexpensive construction, has no moving parts, and is foolproof in operation. An important object of the invention is to provide a detector that requires no calibration, even at optimum gas chromatographic flow rates which are desirably low. These and other objects of the invention will become apparent as the description thereof proceeds.

Briefly, the objects of the invention are attained by providing gas density balance apparatus embodying twin detectors in a flowing reference stream, the reference stream being split into two streams, each of which passes over one of the twin filament detectors. The sample stream is introduced into the apparatus downstream of the twin detectors, and when such sample stream contains a component having a density greater than that of the reference gas, flow tends downward with the result that the reference gas is diverted and the flow over one filament detector is reduced while the flow over the other is increased. This cools the latter filament at a greater rate and permits the other filament to increase in temperature (because of slower dissipation of heat therefrom), causing an imbalance in the electrical bridge circuit including the filament detectors. The resulting net change in the electrical resistances of the filaments is then measured as an indication of the density of the gas sample. In such a system not only is all the diverted gas utilized for detections but the two-fold action of cooling one filament and heating the other contributes to the increased sensitivity without being adversely affected by rates of flow.

Further details and advantages of the described system will be discussed by reference to the accompanying drawings wherein:

FIGURE 1 is a schematic view of a gas density balance constructed in accordance with the invention;

FIGURE 4 is a top view of the apparatus illustrated in FIGURES 2 and 3; and

FIGURE 5 is a diagrammatic showing of an electrical bridge circuit including the filament detectors and adapted for use in conjunction with the apparatus of FIGURES 2, 3 and 4.

Figure 2:
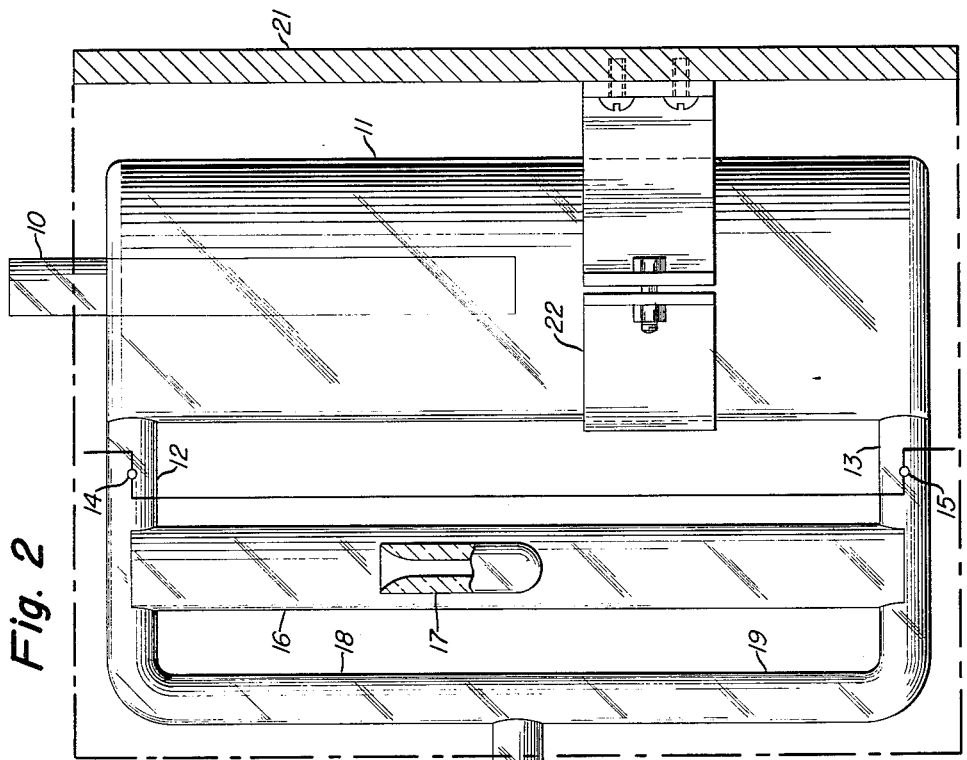
FIGURE 2 is an elevation of a preferred embodiment of the apparatus embodying the principles of FIGURE 1.

Referring to FIGURE 1, the reference gas is introduced by reference gas inlet tube 10 into the mid-point of reference gas chamber 11. The flow of reference gas from the reference gas chamber 11 is divided between top detector tube 12 and bottom detector tube 13. Detector filaments 14 and 15 are disposed in detector tubes 12 and 13, respectively. The sample tube 16 extends between the top detector tube 12 and the bottom detector tube 13 and is provided with sample inlet 17.

When a gas sample entering sample tube 16 contains a sample component having a density greater than that of the reference gas flowing through the balance, the flow in sample tube 16 tends downward. This decreases flow across the bottom detector tube 13 and increases flow across the top detector tube 12. This results in a net change in the resistances of the filaments 14 and 15 which change is measured as an indication of the density of the gas sample introduced into the balance.

The reference gas of now adjusted composition and differing flow rate passes from top detector tube 12 into top outlet tube 18 and from bottom detector tube 13 into bottom outlet tube 19. The combined flow from outlet tubes 18 and 19 emerges from the balance by way of outlet tube 20 which is flow-restrictive.

Figure 3:
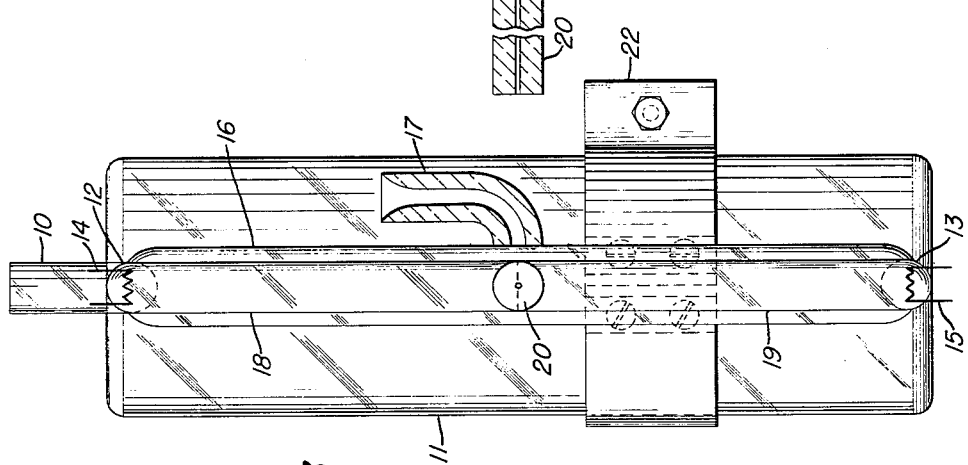
FIGURE 3 is a side view of the apparatus in FIGURE 2.

Referring to FIGURES 2, 3, and 4, the dimensions of the apparatus schematically shown in FIGURE 1 have been chosen to make the most effective use of any change in density to vary the filament resistances. In FIGURES 2, 3 and 4, the reference gas inlet tube 10 has an I.D. of 4 mm., the reference gas chamber 11 is about 100 mm. high with a diameter of about 30 mm. The reference gas inlet tube 10 is shown as extending through the top wall of the reference gas chamber 11 and it is contemplated that such inlet tube 10 may alternatively enter the chamber 11 through the bottom end wall or a side wall. In any event, it is desired to provide for the discharge of the reference gas from the inlet tube 10 at about the geometric center of the chamber 11.

The top and bottom detector tubes 12 and 13 have an I.D. of about 4 mm. The sample tube 16 has an I.D. of about 8 mm., and the sample inlet 17 comprises an elbow having an I.D. of about 2 mm. The outlet capillary tube 20, receiving flow from the top and bottom outlet tubes 18 and 19, has an I.D. of about 0.7 mm. and a length of 40 mm.

One objective in selecting these dimensions is to maximize the effect of change in density caused by the sample and to minimize the pressure drop caused by friction of gas flow, so as to obtain high sensitivity to changes in density constant with linearity and speed of response.

The sample tube 16 is kept to a small volume to give a fast response. Increasing the height of the sample tube 16 increases the driving force of the differences in density but it also increases friction and volume; increasing the diameter of the sample tube 16 also increases volume but it has the beneficial effect of decreasing friction. It tends to compensate for viscosity whereas the effects of viscosity may otherwise be such as to cause non-linear response.

As the driving force is expended in the top and bottom detector tubes 12 and 13, the resistances of the filaments 14 and 15 change with change in temperature which, in turn, reflects the changes in rates of flow over the filaments. Minimizing friction in the balance can be expected to give the largest change in velocity and hence largest electrical resistance change in the filaments. On the other hand, friction insures linear response at low flow rates. Detector tubes 12 and 13 could be shortened to reduce friction but this, if carried to an extreme, would allow some sample to reach the filaments 14 and 15 and make the response non-linear. Thus the arrangement and dimensions given provide a gas density balance which satisfies the need for a gas chromatographic analysis detector that is sensitive, fast, and requires no calibration for individual compounds. It is contemplated that balances of other characteristics may be devised in view of the description herein given. For example, an even faster detector may be designed by reducing the height of the sample tube 16 by 50 percent or more. If more sensitivity is needed, the height and diameter of the sample tube 16 can be increased and the length of the detector tubes 12 and 13 may be shortened, although this latter modification would run the risk of allowing some sample to reach the filaments and make the response non-linear as discussed above.

The complete unit is housed within a temperature-controlled cabinet 21 and supported within the cabinet 21 by any suitable means, such as a bracket 22 clamped to the reference gas chamber 11, for example. It will be apparent that the reference gas inlet tube 10 extends through a top wall of the cabinet 21 and that the outlet capillary tube 20 projects through an end wall thereof. Suitable temperature control means including heaters, thermostats, and the like can be provided for controlling the temperature of the cabinet 21. However, since such temperature control systems are well known in the art, details are not given here.

Referring to FIGURE 5, there is shown a Wheatstone bridge circuit with standard resistances 25 and 26 and the detector filaments 14 and 15 comprising hot wire resistance elements. A constant voltage supply 27, a zero adjusting means 28, and an output voltage-responsive means such as recorder 29, complete a typical bridge circuit. This general type of bridge circuit and its operation are well known and will not be described in further detail.

The top and bottom detector tubes 12 and 13 contain the hot wire elements 14 and 15, respectively, which are preferably precise lengths of tungsten wire, but it is also contemplated that they may be replaced by thermistors, i.e. an element having negative resistance characteristics in which an increase in temperature of the resistance element decreases resistance. Such a detector filament would also increase sensitivity of the balance.

Although the invention has been described with reference to a preferred embodiment thereof, it is to be understood that this is by way of illustration only. Accordingly, it is contemplated that modifications and variations can be made in the apparatus by those skilled in the art in light of the preceding description without departing from the spirit of the invention.

What is claimed is:

1. In a system for testing gases by density, including a pair of vertically displaced reference gas flow conduits withdrawing a reference gas from a common manifold and exhausting through a flow-restrictive outlet means, a sample conduit disposed between and in flow communication with said reference gas flow conduits, and means for introducing the gas undergoing test into said sample conduit, the improvement which comprises two detector means sensitive to rates of flow of gas, one disposed in each of said reference gas flow conduits, for determining differentials in rates of flow of reference gas through each of said conduits due to changes of flow of gas in said sample conduit toward one of the gas flow conduits, the changes in flow differentials caused by changes of flow of gas in said sample conduit being a measure of sample gas density.

2. The system of claim 1 wherein said two detector means comprise a pair of heated elements, one in each conduit, connected in a bridge circuit wherein bridge unbalance is a measure of sample gas density.

3. The system of claim 2 wherein said two detector means comprise thermistors.

4. An apparatus for testing the density of a sample gas which comprises in combination: a reference gas flow system, said system including a pair of vertically displaced unrestricted gas flow conduits communicating with a common reference gas introduction manifold and discharging through a flow restrictive outlet means; a vertical sample gas tube disposed between and in flow communication with both of said reference gas flow conduits; means for introducing sample gas the density of which is to be tested into said vertical sample gas tube; and electrically heated flow-sensitive elements in each of said reference gas flow conduits upstream of said sample gas tube for determining differentials in rates of flow of reference gas through each of said reference gas flow conduits due to changes in flow of sample gas in said sample gas tube toward one of said gas flow conduits as a linear measure of the density of the sample gas.

5. An apparatus for testing the density of a gas comprising a vertically elongated reference gas chamber, a reference gas inlet into said chamber, a bottom detector conduit communicating with the bottom of said reference gas chamber and extending laterally therefrom, a top detector conduit similar in geometry to said bottom detector conduit and extending laterally from the top of said reference gas chamber, a sample gas conduit arranged with its axis substantially parallel to the axis of said reference gas chamber, said sample gas conduit having an upper end merged with said top detector conduit and a lower end merged with said bottom detector conduit, a sample gas introduction conduit communicating with a mid-point of said sample gas conduit, a top outlet conduit and a bottom outlet conduit into which said top detector conduit and said bottom conduit discharge, respectively, an outlet capillary conduit into which said top and bottom outlet conduits discharge, and means responsive to the rates of flow of gas in each of said top and bottom detector conduits, the changes in said rates being a measure of sample gas density.

6. In a system for the measurement of gas density, the apparatus which comprises means for establishing separate streams of a reference gas, means for directing said streams in vertically spaced planes, means for maintaining a quantity of a gas sample in fluid communication with both of said streams, means for commingling at least a part of said sample with one of said streams by gravity whereby the relative rates of flow of said initially established separate streams is changed, and means in each of said streams for measuring the resultant change in rates of flow of each of said streams as a measure of gas density.

7. In a method for the measurement of gas density, the steps which comprise establishing separate streams of a reference gas, directing said streams in vertically spaced planes, measuring the rates of flow of each of said streams, maintaining a quantity of a gas sample in fluid communication with both of said streams, commingling at least a part of said sample with one of said streams by gravity whereby the relative rates of flow of said initially established streams is changed, and determining the resultant differences in said measured rates of flow.

References Cited in the file of this patent
UNITED STATES PATENTS
2,728,219    Martin _____ Dec. 27, 1955

OTHER REFERENCES

Vapour Phase Chromatography by D. H. Dasty from Symposium on May 30–June 1, 1956, published in London 1957, pages 145–153.